United States Patent
Boehm et al.

(10) Patent No.: US 9,367,424 B2
(45) Date of Patent: Jun. 14, 2016

(54) METHOD FOR PERFORMANCE MONITORING AND OPTIMIZATION VIA TREND DETECTION AND FORECASTING

(71) Applicant: International Business Machines Corporation, Armonk, NY (US)

(72) Inventors: Omer Y Boehm, Haifa (IL); Anat Hashavit, Haifa (IL); Roy Levin, Zihron Yaakov (IL); Yousef Shajrawi, Nazareth (IL)

(73) Assignee: International Business Machines Corporation, Armonk, NY (US)

( * ) Notice: Subject to any disclaimer, the term of this patent is extended or adjusted under 35 U.S.C. 154(b) by 180 days.

(21) Appl. No.: 14/207,647

(22) Filed: Mar. 13, 2014

(65) Prior Publication Data

US 2015/0261649 A1 Sep. 17, 2015

(51) Int. Cl.
*G06F 11/00* (2006.01)
*G06F 11/34* (2006.01)

(52) U.S. Cl.
CPC .................... *G06F 11/3466* (2013.01)

(58) Field of Classification Search
CPC ........................................................ G06F 11/34
USPC ................... 714/47.1, 47.3, 48, 49
See application file for complete search history.

(56) References Cited

U.S. PATENT DOCUMENTS

| | | | |
|---|---|---|---|
| 7,743,286 B2 * | 6/2010 | Bangel | G06Q 10/08 709/224 |
| 8,341,663 B2 | 12/2012 | Shaffer et al. | |
| 2012/0016948 A1 | 1/2012 | Sinha | |
| 2012/0130940 A1 | 5/2012 | Gattani et al. | |
| 2012/0278135 A1 * | 11/2012 | Haber | G06Q 10/00 705/7.38 |
| 2012/0330728 A1 | 12/2012 | Enyeart et al. | |
| 2013/0151522 A1 | 6/2013 | Aggarwal et al. | |
| 2013/0190095 A1 | 7/2013 | Gadher et al. | |

OTHER PUBLICATIONS

Jon Kleinberg, "Bursty and Hierarchical Structure in Streams.", KDD '02 Proceedings of the eighth ACM SIGKDD international conference on Knowledge discovery and data mining, pp. 91-101.
Jon Kleinberg, "Temporal Dynamics of On-Line Information Streams.", IIn Data Stream Management: Processing High-Speed Data Streams, Springer, 2004.

(Continued)

Primary Examiner — Dieu-Minh Le

(57) ABSTRACT

A method for identifying trends in system faults. During a generating stage, monitoring via a software based performance monitoring unit, a state of a server on a network and generating hardware or software performance information which indicate system faults of the server. During an analysis stage including, creating a dataset from the hardware or software performance information and isolating events from the dataset and categorizing each of the isolated events into a type, each type representing one application program call return. For each event in the dataset, assigning a trend score which decays with time such that recent events receive greater weight in the assigning than less recent events. Finally, performing one or more of: outputting a notification of the trend score, utilizing an optimization unit or triggering operation of a fault system handler for the event, when the trend score is above a threshold.

19 Claims, 3 Drawing Sheets

(56) References Cited

OTHER PUBLICATIONS

Stanislav Nikolov, "Trend or No Trend: A Novel Nonparametric Method for Classifying Time Series", In partial fulfillment of the requirements for the degree of Master of Engineering in Electrical Engineering and Computer Science, Massachusetts Institute of Technology, Aug. 15, 2012.

Heysoon et al., "Virtual program counter (vpc) prediction: Very low cost indirect branch prediction using conditional branch prediction hardware." IEEE Transactions on Computers, vol. 58, issue 9, pp. 1153-1170, Sep. 2009.

Dahlgren et al., "Sequential hardware prefetching in shared-memory multiprocessors.", IEEE Transactions on D Parallel and Distributed Systems, vol. 6, Issue 7, pp. 733-746, Jul. 1995.

Markus Fensterer, "Supporting Capacity Planning of Cloud Computing Data Centers with Long Term Trend Analysis of Performance Monitoring Data", A bachelor's thesis, The faculty of Computer Science, The Technical University of Munich, Jul. 16, 2012.

Koudas et al., "Twitter Monitor: trend detection over the twitter stream", SIGMOD '10 Proceedings of the 2010 ACM SIGMOD International Conference on Management of data, pp. 1155-1158.

Robert Strahan et al., "A Method for Scalable Real-Time Network Performance Base lining, Anomaly Detection, and Forecasting", International Journal of Business Intelligence Research, 3(2), pp. 13-33, Apr.-Jun. 2012.

* cited by examiner

METHOD FOR PERFORMANCE MONITORING AND OPTIMIZATION VIA TREND DETECTION AND FORECASTING

BACKGROUND

The present invention, in some embodiments thereof, relates to system performance monitoring systems and, more specifically, but not exclusively, to methods and systems of detecting performance trends.

Electronic system monitoring is becoming increasingly important as systems are becoming more complex and inclusive of several networked machines. Systems can change very frequently between hardware and software problems. System events such as cache misses and system faults can increase and decrease in frequency over time. Many current performance monitoring systems may be capable of determining overall system events.

Current systems, however, are not capable of determining what performance monitoring issues are currently present or trending within a system. There exists therefore, a need in the art to determine what performance issues are trending in a system and how to detect and deal with them.

SUMMARY

According to some embodiments of the present invention there is provided a method for identifying trends in system faults, comprising: a generating stage including: monitoring via a software based performance monitoring unit, a state of a server on a network and generating hardware or software performance information which indicate system faults of the server; an analysis stage including: creating a dataset from the hardware or software performance information and isolating events from the dataset and categorizing each of the isolated events into a type, each type representing one application program call return; wherein for each event in the dataset: assigning a trend score which decays with time such that recent events receive greater weight in the assigning than less recent events; and performing one or more of: outputting a notification of the trend score, utilizing an optimization unit or triggering operation of a fault system handler for the event, when the trend score is above a threshold.

Optionally, the method comprises the trend score is calculated utilizing a geometric summation and user defined parameters which weigh the impact of whether an event occurred or not.

Optionally, the method comprises wherein the trend score is further calculated according to the following formulas: Service Rate $(t_i)$=alpha$^d$*Service Rate $(t_{i-1})$+(1−alpha)*event Score; where t indicates time at iteration i, event Score indicates whether an event occurred or not, alpha is set by the user to describe how much weight to assign new events in comparison to old events and d indicates the time passed from the occurrence of the event to the occurrence of the event before it; and trend score $(t_i)$=beta*(Trend Score $(t_{i-1})$+event Score−Service Rate*(Geometric Sum (alpha, d−1)+1)); where Geometric Sum provides a geometric summation, and beta is set by the user to describe how fast an existing trend should fade.

Optionally, the method comprises wherein the notification includes a chart detailing a plurality of events and their respective scores over time.

Optionally, the method comprises wherein an information technologies professional utilizes the information in the chart to modify the server to reduce a trending event.

Optionally, the method comprises wherein the notification further includes an optimization unit which optimizes the server to mitigate performance bottlenecks by updating the upload rate being used according to the trending event.

Optionally, the method comprises wherein the notification further includes an optimization unit which submits data prefetching instructions.

Optionally, the method comprises wherein the notification further includes an optimization unit which generates a new resource allocation policy for use in cloud management when a quality of service on the server is degraded.

Optionally, the method comprises wherein the notification further includes a dynamic binary code optimization unit for optimizing the server.

Optionally, the method comprises wherein each of the isolated events has a time stamp indicating when the event occurred for use in the trend score.

Optionally, the method comprises wherein alpha and beta are values between 0 and 1.

Optionally, the method comprises a computer readable medium comprising computer executable instructions adapted to perform the method of claim 1.

According to some embodiments of the present invention there is provided a system for identifying trends in system faults, comprising: a processor; a generating module which monitors via a software based performance monitoring unit, a state of a server on a network and generating hardware or software performance information which indicates system faults of the server; an analysis module which creates a dataset from the hardware or software performance information and isolates events from the dataset and categorizes each of the isolated events into a type, each type representing one application program call return; wherein for each event in the dataset: assigning a trend score which decays with time such that recent events receive greater weight in the assigning than less recent events; and an output unit which performs one or more of: outputting a notification of the trend score, utilizing an optimization unit or triggering operation of a fault system handler for the event, when the trend score is above a threshold.

Optionally, the system comprises wherein the trend score is calculated utilizing a service rate calculated according to the following formula: Service Rate $(t_i)$=alpha$^d$*Service Rate $(t_{i-1})$+(1−alpha)*event Score; where t indicates time at iteration i, event Score indicates whether an event occurred or not, alpha is set by the user to describe how much weight to assign new events in comparison to old events and d indicates the time passed from the occurrence of the event to the occurrence of the event before it.

Optionally, the system comprises wherein the trend score is further calculated according to the following formula: trend score $(t_i)$=beta*(Trend Score $(t_{i-1})$+event Score−Service Rate*(Geometric Sum (alpha, d−1)+1)), where Geometric Sum provides a geometric summation, and beta is set by the user to describe how fast an existing trend should fade.

Optionally, the system comprises wherein the server is an HTTP server.

Optionally, the system comprises wherein the server is connected through one of a LAN, WLAN, WAN, SAN or 4G network.

Optionally, the system comprises wherein the notification further is monitored by an information technologies expert.

Optionally, the system comprises wherein the server is a Virtual Machine monitoring system.

Optionally, the system comprises wherein the optimization unit performs load balancing and shifts work to one of: other servers, multi-core processor and computation nodes.

According to some embodiments of the present invention there is provided a computer program product for identifying trends in system faults, said computer program product comprising: a computer readable storage medium having stored thereon: first program instructions executable by a device processor, to cause the device to monitor via a software based performance monitoring unit, a state of a server on a network and generating hardware or software performance information which indicates system faults of the server; second program instructions executable by the device to cause the device to create a dataset from the hardware or software performance information and isolate events from the dataset and categorize each of the isolated events into a type, each type representing one application program call return; assigning a trend score which decays with time such that recent events receive greater weight in the assigning than less recent events; and third program instructions executable by the device to cause the device to perform one or more of: outputting a notification of the trend score, utilizing an optimization unit or triggering operation of a fault system handler for the event, when the trend score is above a threshold.

Optionally, the method comprises wherein the trend score is further calculated according to the following formulas: Service Rate $(t_i)$=alpha$^d$*Service Rate $(t_{i-1})$+(1−alpha)*event Score; where t indicates time at iteration i, event Score indicates a weight given to an event when the event occurs, alpha is set by the user to describe how much weight to assign new events in comparison to old events and d indicates the time passed from the occurrence of the event to the occurrence of the event before it; and trend score $(t_i)$=beta*(Trend Score $(t_{i-1})$+event Score−Service Rate*(Geometric Sum (alpha, d−1)+1)); where Geometric Sum provides a geometric summation, and beta is set by the user to describe how fast an existing trend should fade.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
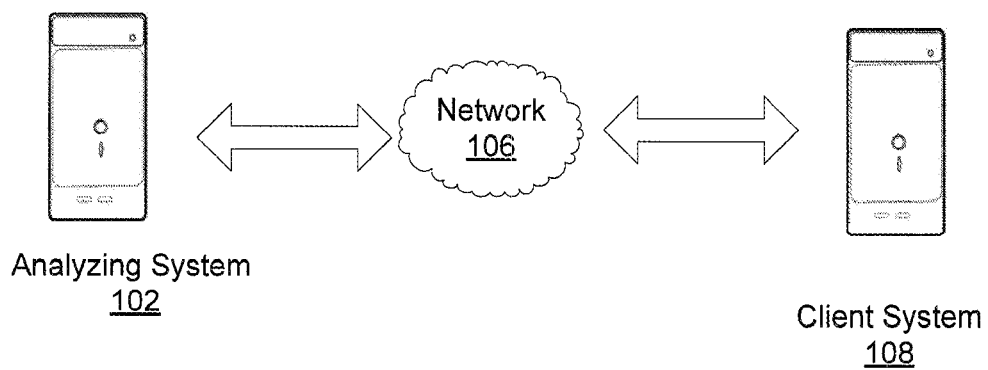
FIG. 1 is a schematic illustration of a system, for performance monitoring and optimization according to some embodiments of the present invention.

The present invention, in some embodiments thereof, relates to system performance monitoring systems and, more specifically, but not exclusively, to methods and systems of detecting performance trends.

Some embodiments of the present invention enable trend detection and forecasting used for system performance monitoring. Typical system performance monitoring units (PMUs) account for overall volume of performance events, however do not indicate which events currently trending. Trending is defined as an event whose occurrence is changing in frequency within a moving time period window. Trend analysis is frequently used as an approach to extract semantics from text. Trend analysis allows predicting topics which are likely to grow in volume within a certain time frame. Some embodiments of the invention enable system monitoring via a virtual software based performance monitoring unit. Optionally, the state of a server on a network is monitored and hardware and/or software performance information is gathered and analyzed to predict and/or indicate system faults of the server.

Optionally, an analysis stage includes the system creating a dataset from the hardware and/or software performance information and isolates events from the dataset and categorizes each of the isolated events into a type, each type representing an application program call return. Optionally, the system assigns a trend score which indicates the frequency of that type of event within a certain period of time or a moving time window for each event of each type in the dataset. Optionally, the trend score accounts for the time period between the current and previous occurrence of the event of that type, and weighs the more recent occurrence(s) of the events of that type more heavily when assigning the trend score. Optionally, the system outputs a notification of the trend score or triggers operation of a fault system handler for the event, when the trend score is above a threshold. Optionally, for each event in the dataset, a trend score is assigned which decays with time such that recent events receive greater weight in the assigning than less recent events.

The benefits of the system in the present invention include real time, up to the minute data on system performance issues present at the time. Overall volume or basic approaches which aggregate system performance information over time will not accurately indicate which system performance issues are trending or increasing or decreasing in frequency currently. Text analysis is being commonly used in detecting trends in mass quantities of data for websites and blogs for example.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a schematic illustration 100 of a system, for performance monitoring and optimization according to some embodiments of the present invention. The system may be used for hardware and/or software performance monitoring which includes gathering data on how hardware devices are performing or software instructions are being executed. The system may monitor continuously or during network performance periods to improve node performance. The system may output statistics on event occurrences or tables indicating performance scores for trending events. An Analyzing System 102 may connect to a Client System 108 through a Network 106. Analyzing System 102 may be one or more network nodes, such as a server, which track performance information from a Client System 108 receiving data in either a push or pull mechanism. A Client System 108 may be a target system for performance analysis. For example, Client System 108 is an Hyper Text Transfer Protocol (HTTP) server that reports its data usage and requests through Network 106 to Analyzing System 102. Optionally, Client System 108 is a hardware PMU. Optionally, Client System 108 is a Virtual Machine (VM) monitoring system. Optionally, Client System 108 is a network monitor. Optionally, the Network 106 is Local Area Network (LAN), Wireless Local Area Network (WLAN), Wide Area Network (WAN), Storage Area Network (SAN) or Fourth Generation (4G) mobile network.

Figure 2:
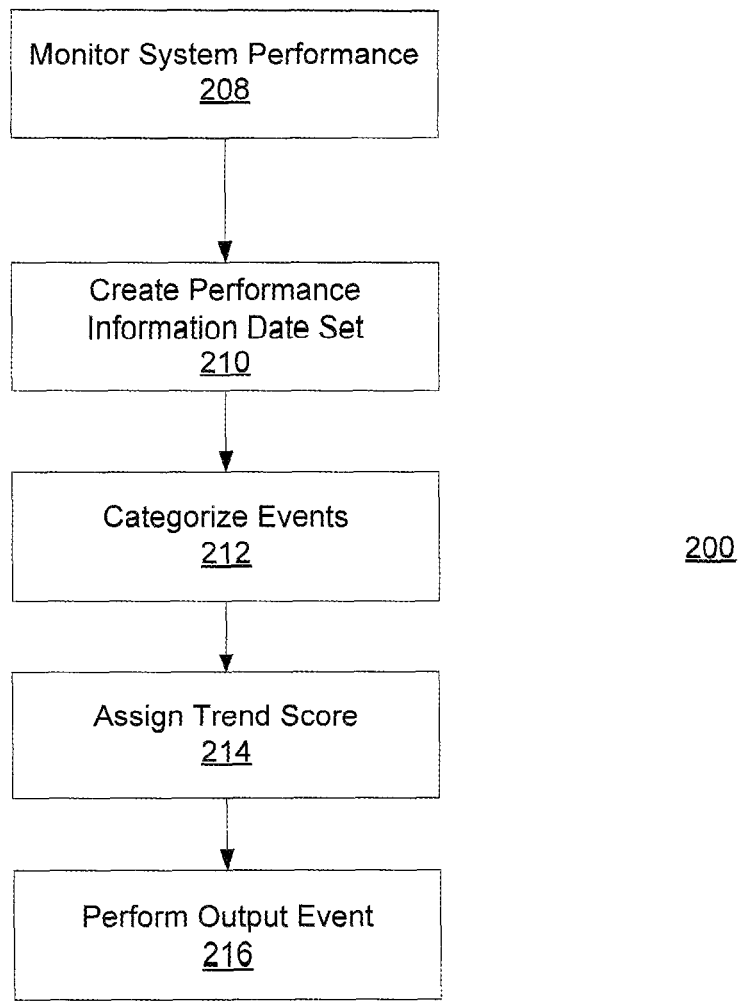
FIG. 2 is a flowchart of a method of system performance monitoring and trend detection according to some embodiments of the present invention.

Reference is now made to FIG. 2 which is a flowchart 200 of a method of system performance monitoring and trend detection according to some embodiments of the present invention. The method in flowchart 200 is a process for detecting trending performance events in a system which may be run continuously as a virtual PMU by a system monitor or as a background task with data output to a system monitor such as in Information Technology (IT) professional In 208 a server such as Analyzing System 102 may monitor the system performance of a networked or attached machine. Optionally, the server monitors the system performance by generating hardware and/or software performance information. Optionally, the performance information indicates system faults, errors or other system level notifications.

In 210, the server creates a performance information dataset. Optionally, the dataset is created from hardware and/or the software performance information. For example, a server may gather information from more than one client system. In 212, the server may categorize events of different types. For example, events are hardware or software related and/or any grouping which are predefined and/or from a list. Optionally, the events are hardware related such as Cycles Per Instruction (CPI), Branches, Caches, Translation Lookaside Buffer (TLB), Floating Point Units (FPU), Effective to Real Address Translations (ERAT), and/or Load Store Units (LSU). Optionally, the events are software related such as a virtual machine's maintenance phase, Java Garbage Collection, and/or network packets rate. Optionally, an event is any occurrence of a system call or application program call on an operating system that has a timestamp. Optionally system events are a continuous or incoming stream of text. Optionally, text analysis is used for streams of performance events to determine which events are streaming.

In 214, the server may cluster events of the same type and score the type according to data concluded from the cluster. Optionally, the server may assign a trend score to types of events that a user selects such as cache misses or branch mispredictions. Optionally, the trend score indicates the frequency of each type of event within a certain period of time. For example, the trend score indicates how many Java Garbage Collections occurred in the past hour, or two hours. Optionally the trend score accounts for the time period between a current and previous occurrence of the event of that type. Optionally, the server weighs the more recent occurrences of events more heavily in assigning the score. For example, the Virtual PMU of the server reduces the weight of events older than two weeks, or three weeks when updating the trend score In some embodiments the trend score may be calculated according to the following set of formulas:

$$\text{Service Rate}(t_i) = \text{alpha}^d * \text{Service Rate}(t_{i-1}) + (1-\text{alpha}) * \text{event Score}.$$

$$\text{Trend score}(t_i) = \text{beta} * (\text{Trend Score}(t_{i-1}) + \text{event Score} - \text{Service Rate} * (\text{Geometric Sum}(\text{alpha}, d-1)+1)).$$

Optionally, t indicates time at an iteration i. Optionally, event Score (1 or 0) indicates whether an event occurred or not. Optionally, alpha is set by the user to describe how much weight to assign new events in comparison to old events. Optionally, d indicates the time passed from the occurrence of the event to the occurrence of the event before it. Optionally Geometric Sum provides a geometric summation. Optionally, beta is set by the user to describe how fast an existing trend should fade. Optionally, alpha and beta are values between 0 and 1. Optionally, an event score is binary or a real number when certain types of events are given more weight.

In 216 the server may perform an output event. Optionally, the output event is a notification of the trend scores. For example, the server outputs a list of trend scores for each type of event. Optionally, the output event is the triggering of a fault system handler for the event when the trend score deviates from a threshold. Optionally, the output event includes a notification with a chart detailing a plurality of events and their respective scores over time. Optionally, the output event occurs where an information technologies professional utilizes the information in the chart to modify the server to reduce a trending event.

Figure 3:
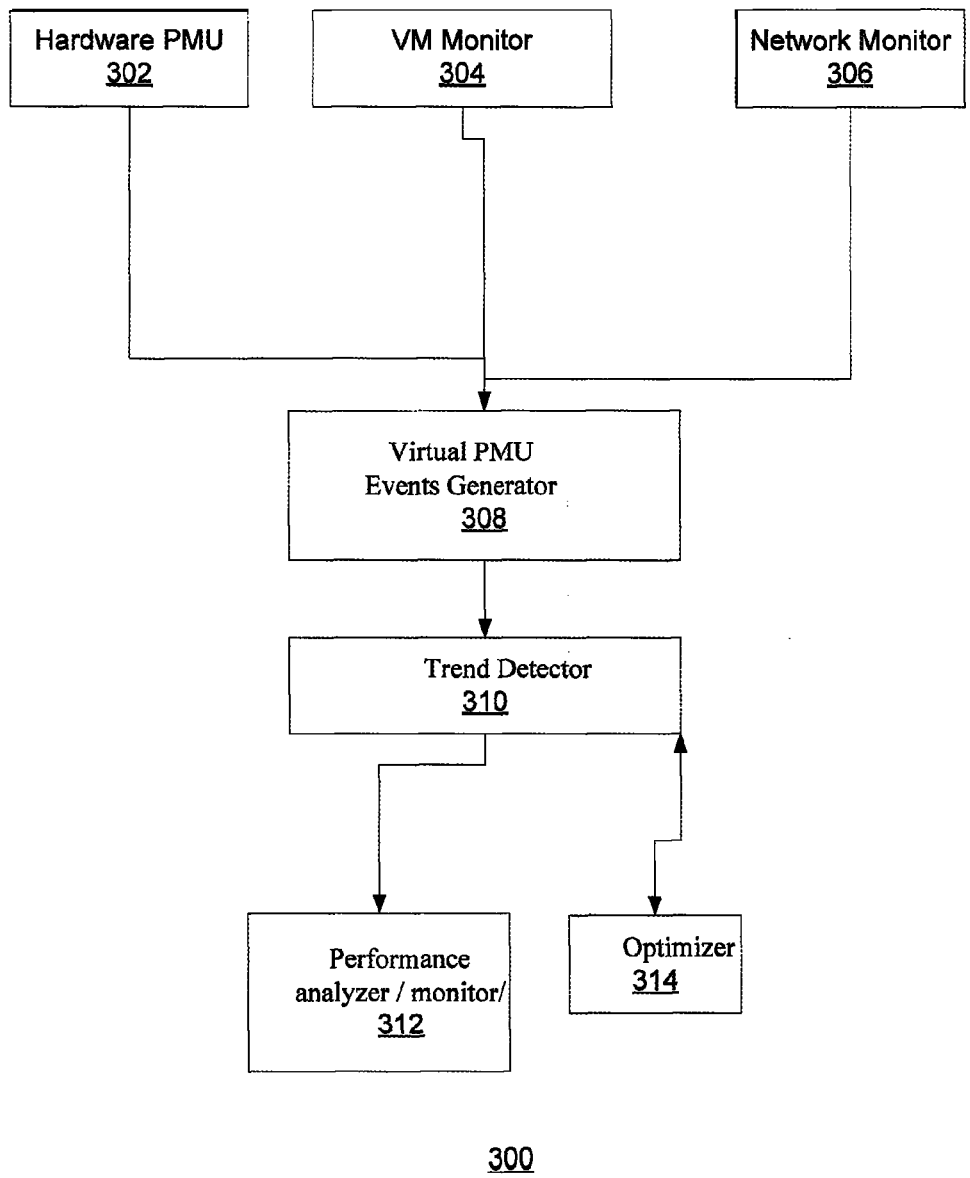
FIG. 3 is an exemplary embodiment of an implementation of a system for communication for performance monitoring.

Reference is now made to FIG. 3 which is an exemplary embodiment 300 of an implementation of a system for communication for performance monitoring. In exemplary embodiment 300 any of Hardware PMU 302, VM Monitor 304 and/or Network Monitor 306 transmit system performance information to Virtual PMU Events Generator 308. Hardware PMU 302, VM Monitor 304 and/or Network Monitor 306 may reside on Client System 108. Virtual PMU Events Generator 308 and Trend Detector 310 may reside on Analyzing System 102.

In some embodiments of the invention, hardware PMU sends branch mispredictions and/or cache misses to the virtual PMU. Optionally, VM monitor sends garbage collection and/or error data to the virtual PMU. Optionally, network monitor sends incoming network requests and/or bandwidth usage data to the virtual PMU.

In some embodiments the virtual PMU monitors the state of a server and generates hardware or software performance information which indicates system faults. Optionally, the virtual PMU creates a dataset from the hardware and/or software performance information. Optionally, the virtual PMU isolates events from the dataset and categorizes each of the isolated events into a type. Optionally, the categorized types represent an application program call return or an application programming interface return. For example, the types are cache misses, branch mispredictions, garbage collections, and/or incoming HTTP requests.

In some embodiments the trend detector 310 assigns a trend score which indicates the frequency of each type of event. Optionally, the trend detector outputs the trend scores for each event type to a performance analyzer/monitor 312 and/or to an optimizer 314. Optionally, the trend detector outputs a report with data of all the trend scores for a manager of a system to use. Optionally, the performance analyzer or optimizer triggers operation of a fault system handler for each event when their score is above a threshold.

In some embodiments of the present invention, an optimization unit such as optimizer 314 is used for dynamic performance analysis and optimization. For example, the optimization unit receives the trends and optimizes the system to mitigate performance bottlenecks For example, data prefetching instructions are inserted ahead to avoid an emerging data cache miss. For example, a different resource allocation policy is used in cloud management due to an expected severe degradation in Quality of Service (QoS) in one of the nodes.

In some embodiments a dynamic binary code optimizer Optionally, the server detects an emerging data cache miss and performs data prefetching on running processes Optionally, the optimization unit is a cloud environment monitoring tool that informs an administrator of an upcoming need for more resources and/or different resource allocation. Optionally, the optimization unit is a grid computing work distributor that schedules which machines on a grid which are working together should be given more/less tasks in the near future and/or when there is a need to re-configure the grid. Optionally the server performs load balancing and shifts work to multiple servers, multi-core processors and/or any set of computation units or nodes. Optionally, the dynamic optimizer gets feedback from the trend detector and makes its own decisions.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the term server and node is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for identifying trends in system faults, comprising:
    monitoring via a software based performance monitoring unit, a state of a server on a network and generating hardware or software performance information which indicate system faults of the server;
    creating a dataset from the hardware or software performance information and isolating events from the dataset and categorizing each of the isolated events into a type, each type representing one application program call return;
    wherein for each event in the dataset:
        assigning a trend score which decays with time such that recent events receive greater weight in the assigning than less recent events; and
    performing one or more of: outputting a notification of the trend score, utilizing an optimization unit or triggering operation of a fault system handler for the event, when the trend score is above a threshold.

2. The method of claim 1 wherein the trend score is calculated utilizing a geometric summation and user defined parameters which weigh an impact of whether an event occurred or not.

3. The method of claim 2 wherein the trend score is further calculated according to the following formulas:

$$\text{Service Rate}(t_i) = \text{alpha}^d * \text{Service Rate}(t_{i-1}) + (1-\text{alpha}) * \text{event Score};$$

where t indicates time at iteration i, event Score indicates whether an event occurred or not, alpha is set by the user to describe how much weight to assign new events in comparison to old events and d indicates the time passed from the occurrence of the event to the occurrence of the event before it; and $$\text{trend score}(t_i) = \text{beta} * (\text{Trend Score}(t_{i-1}) + \text{event Score} - \text{Service Rate} * (\text{Geometric Sum}(\text{alpha}, d-1)+1));$$

where Geometric Sum provides a geometric summation, and beta is set by the user to describe how fast an existing trend should fade.

4. The method of claim 1 wherein the notification includes a chart detailing a plurality of events and their respective scores over time.

5. The method of claim 4 wherein an information technologies professional utilizes the information in the chart to modify the server to reduce a trending event.

6. The method of claim 1 wherein the notification further includes an optimization unit which optimizes the server to mitigate performance bottlenecks by updating the upload rate being used according to the trending event.

7. The method of claim 1 wherein the notification further includes an optimization unit which submits data prefetching instructions.

8. The method of claim 1 wherein the notification further includes an optimization unit which generates a new resource allocation policy for use in cloud management when a quality of service on the server is degraded.

9. The method of claim 1 wherein the notification further includes a dynamic binary code optimization unit for optimizing the server.

10. The method of claim 1 wherein each of the isolated events has a time stamp indicating when the event occurred for use in the trend score.

11. The method of claim 3 wherein alpha and beta are values between 0 and 1.

12. A system for identifying trends in system faults, comprising:
a memory adapted for storing a code
a processor adapted for executing said code, said code comprising:
code instruction for monitoring via a software based performance monitoring unit, a state of a server on a network and generating hardware or software performance information which indicates system faults of the server;
code instruction for creating a dataset from the hardware or software performance information;
code instruction for isolating a plurality of events from the dataset;
code instruction for categorizing each of the plurality of isolated events into a type, each type representing one application program call return;
code instruction for assigning, for each of said plurality of events in the dataset, a trend score which decays with time such that recent events from said plurality of events receive greater weight in the assigning than less recent events from said plurality of events; and
code instruction for performing one or more of: outputting a notification of the trend score, utilizing an optimization unit or triggering operation of a fault system handler for a respective event from said from said plurality of events, when the trend score is above a threshold.

13. The system of claim 12 wherein the trend score is calculated utilizing a service rate calculated according to the following formula:

Service Rate$(t_i)$=alpha$^d$*Service Rate$(t_{i-1})$+(1-alpha)* event Score;

where t indicates time at iteration i, event Score indicates whether an event occurred or not, alpha is set by the user to describe how much weight to assign new events in comparison to old events and d indicates the time passed from the occurrence of the event to the occurrence of the event before it.

14. The system of claim 13 wherein the trend score is further calculated according to the following formula:

trend score$(t_i)$=beta*(Trend Score$(t_{i-1})$+ event Score−Service Rate* (Geometric Sum(alpha,$d$−1)+1)), where Geometric Sum provides a geometric summation, and beta is set by the user to describe how fast an existing trend should fade.

15. The system of claim 14 wherein the server is connected through one of a LAN, WLAN, WAN, SAN or 4G network.

16. The system of claim 12 wherein the server is a Virtual Machine monitoring system.

17. The system of claim 12 wherein the optimization unit performs load balancing and shifts work to one of: other servers, multi-core processor and computation nodes.

18. A computer program product for identifying trends in system faults, said computer program product comprising:
a non-transitory computer readable storage medium having stored thereon:
first program instructions executable by a device processor, to cause the device to monitor via a software based performance monitoring unit, a state of a server on a network and generating hardware or software performance information which indicates system faults of the server;
second program instructions executable by the device to cause the device to create a dataset from the hardware or software performance information and isolate events from the dataset and categorize each of the isolated events into a type, each type representing one application program call return;
assigning a trend score which decays with time such that recent events receive greater weight in the assigning than less recent events; and
third program instructions executable by the device to cause the device to perform one or more of: outputting a notification of the trend score, utilizing an optimization unit or triggering operation of a fault system handler for the event, when the trend score is above a threshold.

19. The computer program product of claim 18, wherein the trend score is further calculated according to the following formulas:

Service Rate$(t_i)$=alpha$^d$*Service Rate$(t_{i-1})$+(1-alpha)* event Score;

where t indicates time at iteration i, event Score indicates a weight given to an event when the event occurs, alpha is set by the user to describe how much weight to assign new events in comparison to old events and d indicates the time passed from the occurrence of the event to the occurrence of the event before it; and trend score$(t_i)$=beta*(Trend Score$(t_{i-1})$+ event Score−Service Rate* (Geometric Sum(alpha,$d$−1)+1));

where Geometric Sum provides a geometric summation, and beta is set by the user to describe how fast an existing trend should fade.

* * * * *